Figures 1, 2:
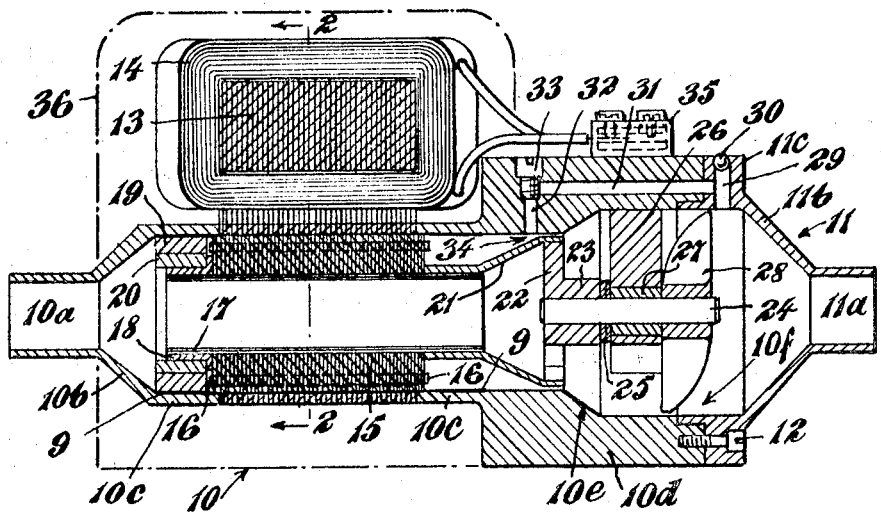

Sept. 6, 1966 S. J. PENMAN 3,270,676

PUMPS

Filed March 27, 1964

INVENTOR

STANLEY JOHN PENMAN

By Bruce Kelman
    agent

United States Patent Office 3,270,676
Patented Sept. 6, 1966

3,270,676
PUMPS
Stanley John Penman, Smethwick, England, assignor to L. W. Penman Engineering Limited, Smethwick, England, a British company
Filed Mar. 27, 1964, Ser. No. 355,161
Claims priority, application Great Britain, Apr. 11, 1963, 14,488/63
3 Claims. (Cl. 103—87)

This invention relates to pumps for fluids and in particular liquids.

The objects of the present invention are to provide an improved pump which is particularly compact in relation to its output, and also to provide an improved pump for use in so called small bore central heating systems or otherwise for direct insertion into a fluid flow line.

In accordance with the invention, a pump for fluids comprises a casing through which the fluid flows and an electric motor having its stator surrounding the casing and its rotor located in the casing, the pump impeller being fast with the rotor and located axially thereof.

One preferred embodiment of the pump in accordance with the present invention is now more particularly described with reference to the accompanying drawing, wherein:

FIG. 1 is a sectional elevation of a pump; and
FIG. 2 is a transverse sectional view taken on the line 2—2 of FIG. 1.

The pump shown in the drawing comprises a casing 10 which may be made of metal for example as a die-casting, or possibly moulded from a synthetic resinous material. The casing includes an outlet portion 10a which is typical of a similar bore to the pipe to which it is to be connected; for example if the pump is to be used in a small bore central heating system using ½" nominal bore pipe to convey hot water from a boiler to a number of radiators, etc., the portion 10a will similarly be of ½" internal diameter. It is intended that connection should be effected by means of a connection sleeve socketed onto the portion 10a and onto the adjacent end of the pipe to be connected thereto, or if desired the portion 10a may be screw-threaded internally or externally, or otherwise adapted for such connection.

The portion 10a is integral with a flared portion 10b which in turn is integral with a larger diameter cylindrical rotor housing portion 10c. A second such rotor housing portion 10c is integral with a portion of casing 10d with a thicker side wall and internally of this portion there is a further outward flared face 10e leading to an impeller chamber 10f. The casing is completed by an inlet connection 11 comprising a portion 11a generally similar to the portion 10a, a flared portion 11b corresponding to the portion 10b and a flange 11c which mates with the end of the casing 10 and is secured in position by a plurality of screws 12 or other convenient means.

Mounted about the rotor housing 10c is a stator comprising a plurality of laminations 13 which are stacked between the two portions 10c and complete the housing and field winding 14 is wound about the laminations. Internally of the rotor housing is a liner sleeve 9 which extends into each portion 10c and is sealed thereto by a sealing compound, and this prevents leakage of water or other fluid into the stator laminations: the tube 9 is quite thin, for example of the order of .004" wall thickness, and may be of aluminium; located within the tube is a rotor comprising a plurality of laminations 15 which are provided with a series of holes located in an annular pattern concentric with the laminations and which receive copper conductors 16. The ends of the conductors are flanged over and the laminations 15 may be slightly staggered with respect to one another so that the conductors 16 extend helically.

The complete rotor is tinned to unite the ends of the conductors to the laminations and prevent ingress of water therebetween in use.

The stator and rotor together are substantially of conventional design, but for the fact that the rotor is immersed in the fluid to be pumped, and constitute a squirrel-cage motor.

The rotor is mounted on and fast with a liner tube 17 of similar bore to the inlet and outlet portions 10a, 11a and this tube extends beyond the rotor laminations at each end. At the delivery end of the pump the tube is fast with a sleeve 18 which is journalled in a packing ring 19 with an interposed bush 20 which may for example be of Phosphor bronze with graphite impregnation for bearing purposes. It is desirable that the bush or its lubricant should not be such as to absorb water which might cause a swelling and hence jamming of the bearing provided at this point, or alternatively is such that the swelling is calculable and does not exceed a predetermined amount. In practice it is preferred to use an impregnated fibre bush which does swell to an extent which provides the appropriate bearing clearance.

At the other end of the rotor to the delivery outlet 10a the tube 17 is fast with a carrier shell 21 having an outward flared portion and in the larger diameter end of this shell is mounted an apertured spacer such as a three-legged spider 22. The spider has a supporting boss 23 and secured in the spider and boss is a spindle 24. If desired the parts 22, 23, and 24 may be made integral for example as a die-casting, and the shell 21 can further be integrally cast or formed with the parts 22 to 24.

Located on the spindle 24 adjacent the boss 23 and with an interposed face bearing washer or washers 25 is a bearing 26 which may be in the form of an apertured ring or another three-legged spider and a bush 27 supports the spindle from the bore of this spider. This bush is similar to the bush 20.

Mounted and fast with the spindle 24 on the opposite side of the spider 26 to the shell 21 is an impeller 28 which may be of any suitable design for example it may be a four-bladed impeller arranged to force liquid from the inlet portion 11a in a substantially axial direction through the spider 26 and spider 22 and hence through the tube 17 to the outlet portion 10a.

It is anticipated that the impeller may be a die-casting or a further plastics moulding and it may be cemented to the spindle 24 by a suitable adhesive or rendered fast therewith by any other means.

As shown in the drawing a by-pass is provided from one side of the impeller to the other comprising a radially extending passage 29, the outer end of which is closed by a ball plug 30, a passage 31 which extends parallel to the passage 29 and housing a bleed adjusting screw 33 adapted to control the rate of flow through the passages; passage 32 opens to the rotor housing 10c adjacent the flared portion of the shell 31. Hence water flowing through the by-pass passages may find its way into the rotor liner tube 17 via the small clearance 34 between the shell 21 and the rotor housing and through the spider 22.

The by-pass passages are not essential to the invention but enable the effective head of the pump to be varied; that is to say by adjusting the bleed screw whilst maintaining the power input to the pump substantially constant the rate of delivery of the pump may be varied.

Mounted on the portion 10d of the casing is a terminal block 35 carrying electric connections to the motor, and the motor itself and the rotor housing portion of the casing may be enclosed by a cowl or jacket 36 shown in chain dot lines in the drawing.

A typical pump made for small bore heating having a 15-watt input has been found to run at about 2800 r.p.m. when running free, i.e., without liquid in the pump and is believed to run at about 2000 r.p.m. under load. The maximum head of this pump is about 24″ and at about 6″ head the delivery rate is about 2 gallons per minute.

It will be appreciated that the pump is particularly compact due to the immersed rotor and the axial location of the impeller.

If made in a larger size than those quoted, for example for purposes other than small bore central heating, the advantages of compact size relative to rate of output are maintained.

The pump may be mounted without any brackets or the like supporting it from the floor, wall or other surface and be simply carried between the adjacent ends of the inlet and outlet pipes connected thereto; this is possible because of the comparatively light weight of the pump and provides advantages in simplifying fixing, and also possibly in silent running since vibration is liable to be absorbed in the pipe connections.

Additional advantages are that there are no rotating fields, thus simplifying manufacture, and the pump is substantially flash-proof.

I claim:
1. A pump for liquids comprising, in combination:
   (a) a casing having an axis and defining an inlet, a rotor chamber, an impeller chamber, and an outlet, said inlet, said outlet, and said chambers being axially aligned and jointly constituting a straight-line flow path through said chamber;
   (b) a stator winding mounted on the outside of said casing and surrounding said rotor chamber;
   (c) a liner tube axially extending in said rotor chamber and having two axial end portions;
   (d) a rotor winding mounted on said liner tube in said rotor chamber;
   (e) a first bearing in said casing, one of the end portions of said liner tube being journaled in said bearing;
   (f) a first apertured spider member on the other end portion of said liner tube;
   (g) an impeller spindle coaxially fastened to said spider member and extending in said impeller chamber, said impeller spindle having two axial end portions, one of said end portions being fastened to said first spider member;
   (h) impeller means mounted on said spindle in said impeller chamber for axially driving liquid along said path;
   (i) a second bearing in said impeller chamber and rotatably receiving said spindle, the other end portion of said impeller spindle intermediate said end portions being received in said second bearing; and
   (k) another apertured spider member radially interposed between said casing and said second bearing in said impeller chamber.

2. A pump as set forth in claim 1, wherein said impeller means includes a plurality of blades fastened to said spindle and defining respective portions of said path therebetween.

3. A pump as claimed in claim 2, the total cross-sectional areas of the apertures through the two spiders being substantially equal to the individual cross-sectional areas of the liner, the inlet, and the outlet.

References Cited by the Examiner

UNITED STATES PATENTS

| 1,114,727 | 10/1914 | Breeze | 103—87 |
| 1,539,195 | 5/1925 | Kremser | 103—87 |
| 2,263,719 | 11/1941 | Davies | 103—87 |
| 2,791,967 | 5/1957 | Klauss | 103—87 |

FOREIGN PATENTS

| 514,697 | 12/1930 | Germany. |
| 909,550 | 10/1962 | Great Britain. |

ROBERT M. WALKER, *Primary Examiner.*